March 10, 1953 W. FIKSE 2,630,888
HYDRAULIC BRAKE ACTUATING DEVICE FOR TRAILERS
Filed July 10, 1950
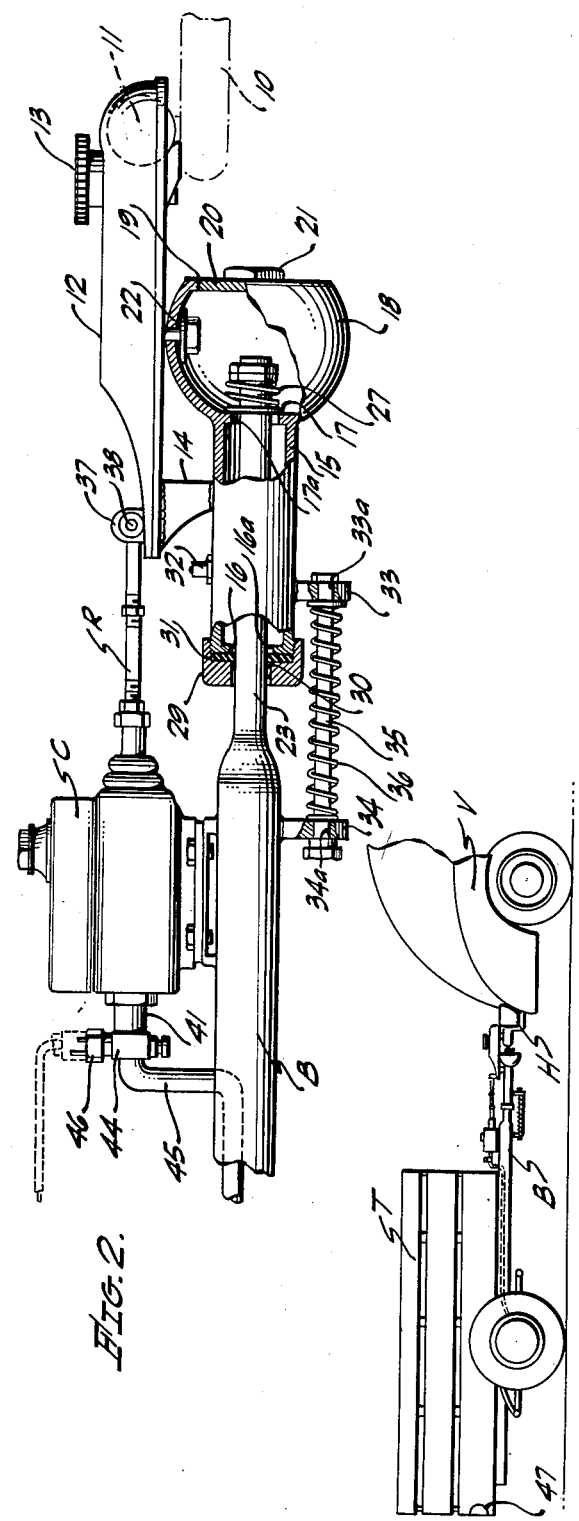
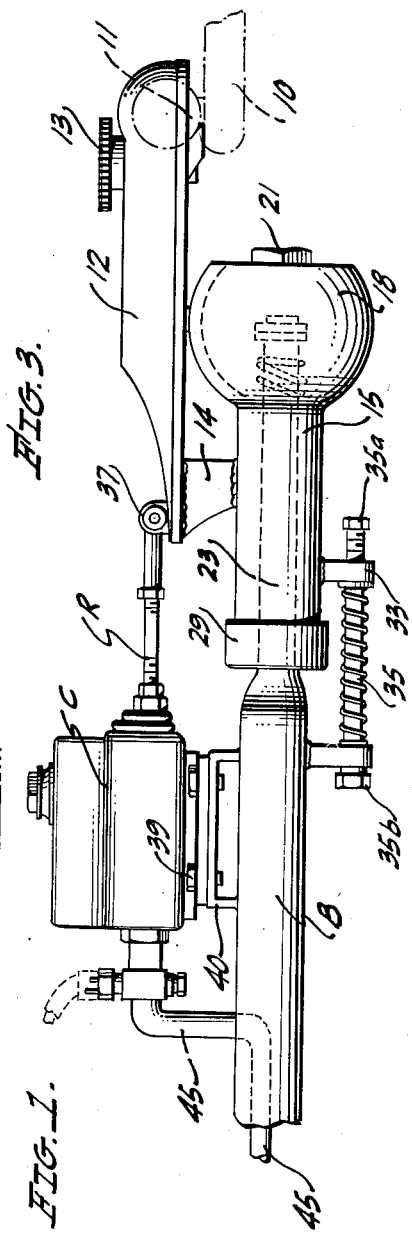
INVENTOR.
WILHELM FIKSE,
BY
ATTORNEY.

Patented Mar. 10, 1953

2,630,888

UNITED STATES PATENT OFFICE 2,630,888

HYDRAULIC BRAKE ACTUATING DEVICE FOR TRAILERS

Wilhelm Fikse, Buena Park, Calif.

Application July 10, 1950, Serial No. 172,932

5 Claims. (Cl. 188—112)

My invention relates to the field of brakes, and more particularly to a device to automatically actuate the brakes of a trailer when the drawing vehicle is in the process of being slowed down or brought to a stop.

Although numerous brakes and brake actuating devices particularly adapted for use on trailers have been devised and marketed in the past, the majority of these devices have the disadvantage that a hose or cable must extend from the drawing vehicle to the trailer. Such an arrangement requires that the hose or cable have a connector forming a part thereof to permit the vehicle and trailer to be separated when desired. Obviously this arrangement not only requires that an operator must couple or uncouple the hose or cable when needed, but that he must constantly be vigilant against the possibility of the hose or cable becoming accidentally uncoupled while the vehicle is on the road.

A further hazard in having a hose or cable extend from the drawing vehicle to the trailer is the very real possibility that the hose or cable may fall downwardly when the vehicle or trailer is in motion, and be severed by moving contact with the road surface.

The purpose of my invention is to provide a brake actuating device for trailers that will eliminate the above mentioned disadvantages.

A major object of my invention is to supply a brake actuating device that is operated by the forward momentum of the trailer during the time the drawing vehicle is in the process of being slowed down or brought to a stop, does not require a hose or cable connection between the vehicle and trailer, and operates automatically without attention from the driver of the vehicle.

Another object of my invention is to provide a brake actuating device that has a simple mechanical structure, is compact, attractive in appearance, may be fabricated from standard commercially available material, and due to its low cost of production, may be retailed in the medium priced merchandising field.

These and other objects and advantages of my invention will become apparent from the following description of a preferred form thereof, and from the drawing illustrating that form in which:

Figure 1 is a side elevational view of a drawing vehicle and trailer, with my brake actuating device situated therebetween;

Figure 2 is a combined side elevational and vertical cross sectional view of my brake actuating device in a non-braking position; and, Figure 3 is a side elevational view of my device in a braking position.

Referring now to the drawing for the general arrangement of my invention it will be seen that a trailer T has a draw bar B that extends forwardly therefrom, and is removably connected on its forward end to a vehicle V by the use of a ball and socket type trailer hitch H. Although other types of trailer hitches may be employed in connecting the vehicle V and trailer T, I prefer to use the ball and socket type hitch for this purpose. A conventional master hydraulic brake cylinder C is mounted in a fixed position on the draw bar B, and has the forward end of a piston rod R forming a part of the cylinder connected to the trailer hitch. The draw bar B is adapted to move longitudinally relative to the hydraulic cylinder C, and upon the vehicle being slowed down, the momentum of the trailer forces the rod R forwardly relative to the cylinder to actuate the hydraulic brakes (not shown) on the trailer T. The structural details of my invention are best seen in Figures 1 and 3.

The trailer hitch H includes a rigid member 10 and ball 11 shown in phantom line that are affixed to the rear of the vehicle V by conventional means. An elongated rigid member 12 has a socket formed therein that is adapted to movably engage ball 11, and be held in position thereon by a threaded member (not shown) that is actuated by a rotatable handle 13. The ball and socket means movably joining the member 12 to the member 10 is widely used on trailer hitches and need not be described in detail. The ball and socket type connection is not considered a novel feature of my invention as any connection now in use in joining a trailer and vehicle may be used in connecting the members 10 and 12.

In Figures 1 and 3 it will be seen that a lug 14 depends downwardly from the member 12 and supports a cylinder 15 in a substantially horizontal position on the lower end thereof. The cylinder 15 has an inwardly extending annular flange 16 formed on the rear end thereof, and an annular flange 17 formed on the forward end thereof. The forward end of cylinder 15 develops into a housing 18 of annular cross section, with the housing having a tapped bore 19 formed on the forward end thereof that is adapted to engage a threaded cover plate 20. The cover plate 20 is preferably formed with a forwardly extending square or hexagonally shaped member 21 that may be engaged by a wrench to remove the cover plate 20 from the housing 18. The housing 18 has the upper portion thereof secured to the lower face of the member 12 by a screw or bolt 22 or by other conventional fastening means.

The draw bar B develops on its forward end into a portion 23 of annular cross section and of such diameter that it may be slidably inserted in the bores 16a and 17a formed by the flanges 16 and 17 respectively. The extreme forward end of the draw bar portion 23 is threaded and is adapted to have a nut 25 and washer 26 positioned thereon, with a relatively stiff helical spring 27 being situated between the forward face of the flange 17 and the rearward face of the washer 27, for reasons which will hereinafter be explained.

The exterior rearward portion of the cylinder 15 is threaded, and is engaged by a cap 29 that has a longitudinally extending bore 30 formed therein through which the draw bar portion 23 passes. An oil sealing gland 31 is situated between the outer face of the flange 16 and the inner face of the cap 29, as may best be seen in Figure 1. An Alemite type lubricating fitting 32 is positioned on the upper side of the cylinder 15, and permits grease or other lubricating compound to be injected into the confines of the cylinder 15 and the housing 18.

An arm 33 depends downwardly from the cylinder 15 and a similarly positioned arm 34 is supported from the draw bar B. The arms 33 and 34 have longitudinally extending bores 33a and 34a respectively formed therein, and each of the bores is engaged by a bolt 35 that extends between the two arms. The bolt 35 is encircled by a helical spring 36, with the ends of the spring abutting against the interior faces of the arms 33 and 34 for reasons which will hereinafter be explained. The purpose of the bolt 35 is not only to hold the spring 36 in position, but to permit the distance between the interior faces of the arms 33 and 34 to be varied. Thus, when the longitudinal distance between arms 33 and 34 is shortened, a greater force is required to further compress the spring 36, the importance of which will hereinafter become apparent. The bolt 35 is provided with a head 35a and nut 35b.

An arm 37 extends upwardly from the rear portion of the member 12, and has a horizontal bore formed therein that engages a pin 38 which is pivotally connected to the forward end of the piston rod R. The master cylinder C, as may best be seen in Figures 1 and 3, is affixed by bolts 39 to an L-shaped bracket 40 that is welded or otherwise affixed to the upper surface of the draw bar B.

The cylinder C has a fluid outlet 41 provided on the rearward portion thereof, and by means of a conventional pipe fitting 44 having two outlets formed therein, a conduit or tube 45 may extend therefrom to the hydraulic brake on the trailer T. A conventional fluid operated pressure switch 46 is connected to the other outlet of the fitting 44, and as the rod R is actuated, the increase of pressure on the fluid in the cylinder C actuates the switch to complete an electric circuit (not shown) to actuate stop lights 47 provided on the trailer T.

The operation of my invention is extremely simple. The trailer T is connected to the vehicle V by the trailer hitch H. Prior to the device being used the cylinder 15 and housing 18 are filled with a suitable lubricant through the fitting 32 to insure that the draw bar portion 23 may move longitudinally within the confines of the cylinder 15 without undue wear taking place thereon, and also to minimize any noise that may result from such movement taking place. Upon the vehicle V being placed in motion the spring 27 is momentarily compressed as pressure is exerted thereon by the washer 26 due to the inertia of the trailer T. As the drawing vehicle V moves the trailer T the spring 27 expands a certain amount as the inertia of the trailer is overcome. Thus the spring 27 is able to take the shock that occurs as the speed of the vehicle V is accelerated from time to time.

When it is desired to brake the trailer T the speed of the vehicle V is merely reduced. The trailer T has a tendency to continue moving at the speed at which the vehicle formerly traveled, and as a result the draw bar portion 23 tends to move forwardly in the cylinder 15 and housing 18. This forward movement of the draw bar B is resisted by the helical spring 36 being compressed to the position shown in Figure 3. As the draw bar portion 23 moves forwardly relative to the cylindrical shell 15, the rod R is moved rearwardly relative to the master hydraulic cylinder C, and as a consequence the rod causes rearward movement of the piston (not shown) in the cylinder to discharge hydraulic fluid through the outlet 41 and tubing 45 to actuate the hydraulic brake on the trailer. At the same time the pressure on the fluid in the hydraulic cylinders C is increased sufficiently to cause the pressure switch 46 to assume the closed position and complete an electric circuit to the tail light 47 on the trailer. Upon the vehicle V being brought to a stop, or slowed down to a position where it is traveling at substantially the same rate as the trailer T, the spring 36 tends to expand and return the draw bar B to the non-braking position shown in Figure 1. The degree of braking of the trailer T is regulated by the movement of the rod R relative to cylinder C. This movement may be controlled by the stiffness of the spring 36, or by increasing the force required to compress the spring by adjusting the bolt 35 to shorten the distance between the interior faces of the arms 33 and 34. The opposite result is, of course, attained by increasing the distance between arms 33 and 34.

Although the device herein disclosed and described for actuating the hydraulic brake for use on a trailer is fully capable of achieving the objects and providing the advantages hereinbefore mentioned, it is to be understood that it is merely illustrative of the presently preferred embodiment of my invention, and that I do not mean to limit myself to the details of construction herein shown and described other than as defined in the appended claims.

I claim:

1. A device for actuating the hydraulic brakes of a wheeled trailer, which includes: a draw bar affixed to a trailer; a cylinder slidably engaging the forward portion of said draw bar; a housing situated on the forward portion of said cylinder and in communication therewith; means to introduce a lubricant into said cylinder and housing; an elongated member affixed to said cylinder and housing; a trailer hitch capable of connecting said member to a drawing vehicle; an inwardly extending annular flange formed at the juncture of said cylinder and housing; a nut and washer mounted on the forward end of said draw bar; a helical spring encircling said draw bar and situated between said flange and washer to minimize the shock imparted to said draw bar as said vehicle is placed in motion; two lugs, with one of said lugs extending outwardly from said member and the other from said draw bar, and each of said lugs having a longitudinally extending bore formed therein; a longitudinally extending bolt positioned in said bores; a helical spring encircling said bolt and positioned between the inner faces of said lugs, the compression on said spring controlling the forward movement said draw bar may make relative to said member due to the momentum of said vehicle as said drawing vehicle is slowed down; a master hydraulic cylinder mounted on said draw bar; tubular means extending from said master cylinder to the hydraulic brakes of said trailer; and a piston rod extending forwardly from said master cylinder to said member and connected thereto, and said piston rod actuating said master cylinder as said master cylinder is moved forwardly relative thereto due to the forward movement of said draw bar as said drawing vehicle is slowed down.

2. A device for actuating the hydraulic brakes of a wheeled trailer, which includes: a draw bar affixed to a trailer; a cylinder slidably engaging the forward portion of said draw bar; a housing situated on the forward portion of said cylinder and in communication therewith; means to introduce a lubricant into said cylinder and housing; an elongated member affixed to said cylinder and housing; a trailer hitch capable of connecting said member to a drawing vehicle; an inwardly extending annular flange formed at the juncture of said cylinder and housing; an enlargement formed upon the forward end of said draw bar; a helical spring encircling said draw bar and situated between said flange and said enlargement to minimize the shock imparted to said draw bar as said vehicle is placed in motion; two lugs, with one of said lugs extending outwardly from said member and the other from said draw bar, and each of said lugs having a longitudinally extending bore formed therein; a longitudinally extending bolt positioned in said bores; a helical spring encircling said bolt and positioned between the inner faces of said lugs, the compression on said spring controlling the forward movement said draw bar may make relative to said member due to the momentum of said vehicle as said drawing vehicle is slowed down; a master hydraulic cylinder mounted on said draw bar; tubular means extending from said master cylinder to the hydraulic brakes of said trailer; and a piston rod extending forwardly from said master cylinder to said member and connected thereto, and said piston rod actuating said master cylinder as said master cylinder is moved forwardly relative thereto due to the forward movement of said draw bar as said drawing vehicle is slowed down.

3. A device for actuating the hydraulic brakes of a wheeled trailer, which includes: a draw bar affixed to a trailer; a cylinder slidably engaging the forward portion of said draw bar; a housing situated on the forward portion of said cylinder and in communication therewith; an elongated member affixed to said cylinder and housing; a trailer hitch capable of connecting said member to a drawing vehicle; an inwardly extending annular flange formed at the juncture of said cylinder and housing; a nut and washer mounted on the forward end of said draw bar; a helical spring encircling said draw bar and situated between said flange and washer to minimize the shock imparted to said draw bar as said vehicle is placed in motion; two lugs, with one of said lugs extending outwardly from said draw bar, and each of said lugs having a longitudinally extending bore formed therein; a longitudinally extending bolt positioned in said bores; a helical spring encircling said bolt and positioned between the inner faces of said lugs, the compression on said spring controlling the forward movement said draw bar may make relative to said member due to the momentum of said vehicle as said drawing vehicle is slowed down; a master hydraulic cylinder mounted on said draw bar; tubular means extending from said master cylinder to the hydraulic brakes of said trailer; and a piston rod extending forwardly from said master cylinder to said member and connected thereto, and said piston rod actuating said master cylinder as said master cylinder is moved forwardly relative thereto due to the forward movement of said draw bar as said drawing vehicle is slowed down.

4. A device for actuating the hydraulic brakes of a wheeled trailer, which includes: a draw bar affixed to a trailer; a cylinder slidably engaging the forward portion of said draw bar; a housing situated on the forward portion of said cylinder and in communication therewith; an elongated member affixed to said cylinder and housing; a trailer hitch capable of connecting said member to a drawing vehicle; an inwardly extending annular flange formed at the juncture of said cylinder and housing; an enlargement formed upon the forward end of said draw bar; a helical spring encircling said draw bar and situated between said flange and said enlargement to minimize the shock imparted to said draw bar as said vehicle is placed in motion; two lugs, with one of said lugs extending outwardly from said member and the other from said draw bar, and each of said lugs having a longitudinally extending bore formed therein; a longitudinally extending bolt positioned in said bores; a helical spring encircling said bolt and positioned between the inner faces of said lugs, the compression on said spring controlling the forward movement said draw bar may make relative to said member due to the momentum of said vehicle as said drawing vehicle is slowed down; a master hydraulic cylinder mounted on said draw bar; tubular means extending from said master cylinder to the hydraulic brakes of said trailer; and a piston rod extending forwardly from said master cylinder to said member and connected thereto, and said piston rod actuating said master cylinder as said master cylinder is moved forwardly relative thereto due to the forward movement of said draw bar as said drawing vehicle is slowed down.

5. A device for actuating the hydraulic brakes of a wheeled trailer, which includes: a draw bar affixed to a trailer; a cylinder slidably engaging the forward portion of said draw bar; a housing situated on the forward portion of said cylinder and in communication therewith; an elongated member affixed to said cylinder and housing; a trailer hitch capable of connecting said member to a drawing vehicle; an inwardly extending annular flange formed at the juncture of said cylinder and housing; an enlargement formed upon the forward end of said draw bar; a helical spring encircling said draw bar and situated between said flange and said enlargement to minimize the shock imparted to said draw bar as said vehicle is placed in motion; two lugs, with one of said lugs extending outwardly from said member and the other from said draw bar, and each of said lugs having a longitudinally extending bore formed therein; a longitudinally extending bolt positioned in said bores, said bolt being provided with a nut whereby its effective length may be adjusted; a helical spring encircling said bolt and positioned between the inner faces of said lugs, the compression on said spring controlling the forward movement said draw bar may make relative to said member due to the momentum of said vehicle as said drawing vehicle is slowed down; a master hydraulic cylinder mounted on said draw bar; tubular means extending from said master cylinder to the hydraulic brakes of said trailer; and a piston rod extending forwardly from said master cylinder to said member and connected thereto, and said piston rod actuating said master cylinder as said master cylinder is moved forwardly relative thereto due to the forward movement of said draw bar as said drawing vehicle is slowed down.

WILHELM FIKSE.

REFERENCES CITED

The following references are of record in the file of this patent:

UNITED STATES PATENTS

| Number | Name | Date |
|---|---|---|
| 2,125,702 | Watson | Aug. 2, 1938 |
| 2,354,268 | McNamara | July 25, 1944 |
| 2,513,854 | Fenstermacher | July 4, 1950 |